US012263901B2

(12) United States Patent
Muenster et al.

(10) Patent No.: US 12,263,901 B2
(45) Date of Patent: Apr. 1, 2025

(54) METHOD AND DEVICE FOR CONTROLLING A REAR-AXLE STEERING SYSTEM

(71) Applicant: Bayerische Motoren Werke Aktiengesellschaft, Munich (DE)

(72) Inventors: Martin Muenster, Munich (DE); Martin Sedlmayr, Wessobrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 373 days.

(21) Appl. No.: 17/783,435

(22) PCT Filed: Nov. 9, 2020

(86) PCT No.: PCT/EP2020/081473
§ 371 (c)(1),
(2) Date: Jun. 8, 2022

(87) PCT Pub. No.: WO2021/115695
PCT Pub. Date: Jun. 17, 2021

(65) Prior Publication Data
US 2023/0011747 A1    Jan. 12, 2023

(30) Foreign Application Priority Data
Dec. 11, 2019 (DE) .................. 10 2019 133 917.0

(51) Int. Cl.
*B62D 6/00* (2006.01)
*B62D 5/04* (2006.01)
*B62D 15/02* (2006.01)

(52) U.S. Cl.
CPC ............. *B62D 6/002* (2013.01); *B62D 5/046* (2013.01); *B62D 15/021* (2013.01)

(58) Field of Classification Search
CPC ....... B62D 6/002; B62D 15/021; B62D 5/046
(Continued)

(56) References Cited

U.S. PATENT DOCUMENTS

| 4,721,318 | A | * | 1/1988 | Hase | ................... | B62D 7/14 |
| | | | | | | 180/409 |
| 5,004,063 | A | * | 4/1991 | Oslapas | ............... | B62D 7/1581 |
| | | | | | | 180/445 |

(Continued)

FOREIGN PATENT DOCUMENTS

| CN | 105313958 A | 2/2016 |
| CN | 109747710 A | 5/2019 |

(Continued)

OTHER PUBLICATIONS

International Search Report (PCT/ISA/210) issued in PCT Application No. PCT/EP2020/081473 dated Jan. 28, 2021 with English translation (four (4) pages).

(Continued)

*Primary Examiner* — Richard A Goldman
(74) *Attorney, Agent, or Firm* — Crowell & Moring LLP

(57) ABSTRACT

A method and device for controlling a rear-axle steering system, in particular a rear-axle steering system of a motor vehicle, determines a current physical condition of the rear-axle steering system on the basis of a detected current operating state and a pre-determined reference operating state of the rear-axle steering system. The method defines a maximum permissible steering angle of the rear-axle steering system depending on the estimated physical condition of the rear-axle steering system and depending on at least one of the operating parameters of driving speed, steering angle and steering angle speed of the vehicle, and actuates the rear-axle steering system such that the steering angle of the rear-axle steering system does not exceed the assigned defined maximum permissible steering angle for the current operating parameter(s) of the vehicle.

15 Claims, 5 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 5,047,939 | A * | 9/1991 | Ito .......................... | B62D 7/159 |
| | | | | 701/41 |
| 6,292,094 | B1 * | 9/2001 | Deng ..................... | B62D 7/159 |
| | | | | 701/44 |
| 6,615,944 | B1 * | 9/2003 | Horwath ................ | B62D 7/159 |
| | | | | 180/204 |
| 11,932,308 | B1 * | 3/2024 | Churukian ............ | B62D 15/025 |
| 2006/0025896 | A1 | 2/2006 | Traechtler et al. | |
| 2008/0281489 | A1 | 11/2008 | Le Vourch | |
| 2010/0241314 | A1 | 9/2010 | Boehm et al. | |
| 2016/0039455 | A1 * | 2/2016 | Zeller .................... | B62D 6/001 |
| | | | | 701/41 |
| 2018/0170425 | A1 * | 6/2018 | Jung ....................... | B62D 7/159 |
| 2019/0135337 | A1 * | 5/2019 | Obermüller ......... | B60W 30/045 |
| 2023/0011747 | A1 * | 1/2023 | Muenster ............... | B62D 5/046 |
| 2023/0139711 | A1 * | 5/2023 | Keßler ................. | B62D 15/025 |
| | | | | 701/41 |
| 2023/0264739 | A1 * | 8/2023 | Vogt ....................... | B62D 7/159 |
| | | | | 701/41 |

FOREIGN PATENT DOCUMENTS

| | | |
|---|---|---|
| DE | 39 29 994 A1 | 3/1990 |
| DE | 40 20 567 A1 | 1/1992 |
| DE | 10 2008 026 652 A1 | 2/2009 |
| DE | 10 2009 027 492 A1 | 1/2011 |
| DE | 10 2011 122 535 A1 | 6/2013 |
| DE | 10 2012 015 988 A1 | 10/2014 |
| DE | 10 2013 225 725 A1 | 6/2015 |
| DE | 10 2010 021 761 B4 | 2/2016 |
| DE | 10 2016 201 098 A1 | 7/2017 |
| DE | 10 2017 206 701 A1 | 10/2018 |
| DE | 10 2018 204 065 A1 | 9/2019 |
| EP | 2 899 098 A2 | 7/2015 |
| FR | 2 880 859 A1 | 7/2006 |

OTHER PUBLICATIONS

German-language Written Opinion (PCT/ISA/237) issued in PCT Application No. PCT/EP2020/081473 dated Jan. 28, 2021 (six (6) pages).

German-language Search Report issued in German Application No. 10 2019 133 917.0 dated Aug. 27, 2020 with partial English translation (10 pages).

Chinese-language Office Action issued in Chinese Application No. 202080083360.6 dated Jun. 9, 2023 with English translation (16 pages).

* cited by examiner

METHOD AND DEVICE FOR CONTROLLING A REAR-AXLE STEERING SYSTEM

BACKGROUND AND SUMMARY

The present invention relates to the control of a rear-axle steering system, in particular a rear-axle steering system for a motor vehicle.

While traditionally most motor vehicles, in particular passenger vehicles, only have front steering or front-axle steering, there is also a class of such vehicles which are additionally equipped with a rear-axle steering system. The rear-axle steering system is typically electrically activated and driven via one or more electric motors as actuators. Such a rear-axle steering system can be advantageous in particular in maneuvering operation and during demanding cornering actions, above all at high speed, in relation to the classic only front steering, for example, in that thus even extremely small parking spaces can be effectively used and the road position of the vehicle can be improved during cornering.

In the range of very low vehicle longitudinal speeds, in particular below approximately 6 km/h, which is also referred to hereinafter as the "range close to a standstill", the forces required for steering the vehicle typically grow strongly. Accordingly, the load of the steering device increases, which in particular has negative effects on its service life and can even result in immediate damage. This also applies in particular to rear-axle steering systems. Moreover, steering using the rear axle in the range close to a standstill results in increased energy consumption and the actuator used to actuate the rear-axle steering system typically heats up as a result thereof upon frequent actuation. This in turn can have a negative influence on the availability of the actuator and thus the rear-axle steering system as a whole.

In particular, cases are known in which the rear wheels are still deflected after entering the vehicle standstill, but it is not possible to return the rear wheels back into the straight ahead position at a standstill. The reason for this can be in particular an energy supply of the actuator which is not sufficient in comparison to the occurring adhesive forces at the wheels for applying a corresponding counterforce, which can occur, for example, in the event of excessively high load, instabilities or bottlenecks in the onboard electrical system of the vehicle, or in an inclined position of the wheels on a slope. If the vehicle is left or then put back into operation, the impression can easily arise in the driver due to the deflected rear wheels that the chassis of the vehicle is defective or operates incorrectly. As a result, customer uncertainty and customer dissatisfaction can result and the number and frequency of the repair shop visits and warranty claims because of the rear-axle steering system can increase, although there is actually no defect and thus the repair shop visits and warranty claims are not justified at all.

Against this background, deactivating the rear-axle steering system in the speed range close to a standstill and at the same time positively positioning the wheels of the rear axle straight ahead during such slow driving is known in order to avoid the abovementioned disadvantages. However, this necessarily also has the result that advantages of the rear-axle steering system cannot be used in the speed range close to a standstill.

The present invention is therefore based on the object of further improving the operation of a rear-axle steering system.

This object is achieved according to the teaching of the independent claims. Various embodiments and refinements of the invention are the subject matter of the dependent claims.

A first aspect of the invention relates to a method, which is computer-implemented in particular, for controlling a rear-axle steering system of a vehicle having a steerable front axle and a steerable rear axle. The method comprises: (i) determining a present physical state of the rear-axle steering system on the basis of a detected present operating state and a predetermined reference operating state of the rear-axle steering system; (ii) specifying a maximum permissible steering angle of the rear-axle steering system as a function of the estimated physical state of the rear-axle steering system and as a function of at least one of the operating parameters driving speed (in particular longitudinal speed), steering angle, and steering angle speed of the vehicle; and (iii) activating the rear-axle steering system so that the steering angle of the rear-axle steering system does not exceed the assigned specified maximum permissible steering angle at the present operating parameter(s) of the vehicle.

A "physical state" of the rear-axle steering system is to be understood in the meaning of the invention as its technical "health", which can include in particular mechanical and electrical or mechanical aspects, such as the state of wear of mechanical and/or electrical steering system components, the reliability, the degree of the functional scope still actually available in comparison to the specified function (for example, maximum deflection angle still achievable) of the rear-axle steering system or the current, power, or energy demand for its actuation.

An "operating state" of the rear-axle steering system is to be understood in the meaning of the invention as an operating point characterized by one or more operating parameters, or equivalently a control point, of the rear-axle steering system. The operating parameter(s) can be specified here in particular as a function of a current consumption or power consumption, a supply voltage, or another technical variable used for the energy supply and/or activation of the rear-axle steering system. The operating parameters can be in particular maneuvering variables, such as the vehicle speed, in particular the vehicle longitudinal speed, the steering angle, the steering angle speed (rate of change or time derivative of the steering angle), or electrical operating parameters relating to the energy supply of the rear-axle steering system, in particular at least one actuator thereof.

The physical state of the rear-axle steering system and its operating state are combined under the term "overall status" of the rear-axle steering system hereinafter.

A "reference operating state" in the meaning of the invention is accordingly a selected operating state which was specified as a reference and is defined as a reference by corresponding reference values of the at least one observed operating parameter, for example, by a maximum power consumption or current consumption.

The "steering angle speed" is a measure here of the change over time, in particular a mathematical time derivative, of the steering angle. The "steering angle" itself is in turn to be understood as a measure of the deflection of the rear wheels by the rear-axle steering system in relation to their position for straight ahead driving.

A "rear-axle steering system" in the meaning of the invention is to be understood as a steering device which is designed and intended for the purpose of steering or deflecting one or more rear wheels of a vehicle in a controlled manner for the purpose of steering. An "axle" in the conventional meaning, in particular for connecting two or more wheels, is not necessarily required for this purpose. Rather, the rear wheel or the rear wheels can in particular each also be installed by means of a single wheel suspension on the vehicle and can be activated individually or jointly for their steering.

In the method, the rear-axle steering system can thus also be used in the operating range close to a standstill, if it results on the basis of the determination of its physical state that this is, on the one hand, presumably possible without damaging the rear-axle steering system and, on the other hand, without losing the possibility of returning them back into a non-deflected position (i.e., straight ahead position) in this entire operating range, in particular from a standstill. The method thus permits, on the basis of the specification of a maximum steering angle for the range close to a standstill as a function of the physical state, the advantages of also using the rear-axle steering system in the range close to a standstill, or even at a standstill, to be combined with avoiding negative influences on the rear-axle steering system.

Preferred embodiments of the method are described hereinafter, which can each be combined with one another as desired and with the further described other aspects of the invention, if not expressly excluded or technically impossible.

In some embodiments, the present physical state of the rear-axle steering system is determined on the basis of a detected present utilization of the specified operating range of an actuator of the rear-axle steering system provided for its actuation which characterizes the present operating state. "Utilization" of the specified operating range is to be understood here as a measure which indicates by which proportion or degree the operating range is used. This can be in particular a relative measure in this case, which relates the variable of the specified operating range with respect to an operating parameter to a corresponding variable for the present operating state or vice versa. Alternatively or additionally, it can in particular also be a measure which characterizes a difference between these two variables, for example, in the meaning of a difference. In these embodiments, the determination of the present physical state of the rear-axle steering system can take place in a simple manner for the respective present operating point of the rear-axle steering system, in particular its actuator.

In some of these embodiments, the reference operating state defines a predetermined reference utilization of the operating range and the present physical state of the rear-axle steering system is determined on the basis of a comparison of the detected present utilization of the operating range of the actuator to the reference utilization. In this case, the present utilization and the reference utilization are each related to the same operating parameter(s) of the rear-axle steering system and their equal values. The comparison can thus take place in particular on the basis (i) of a state value which is easily sensorially detectable for the present operating state (for example, present current consumption and/or power of the actuator at a present longitudinal speed and a present steering angle speed and present steering angle), thus on the basis of the present overall state, and (ii) a state value corresponding thereto for the reference operating state (for example, specified or previously measured and stored value for the current consumption of the actuator at the same longitudinal speed and the same steering angle speed and the same steering angle).

In some embodiments, the reference utilization represents an operating point on a characteristic curve related to the operating range or a multidimensional characteristic curve surface for the utilization of the actuator, wherein for each operating point on this characteristic curve or characteristic curve surface, the actuator can ensure a reset of the rear axle from a position corresponding to a steering angle not equal to zero into a non-deflected position, while it can no longer ensure this for any utilization above this characteristic curve or this characteristic curve surface. The characteristic curve or the characteristic curve surface thus represents a limiting characteristic curve or limiting characteristic curve surface which, for the observed operating parameter range, separates a lower utilization range, in which a reset is always still possible, from an upper utilization range, in which a reset is no longer always possible. The reference utilization determined by the characteristic curve or characteristic curve surface is therefore selected in these embodiments so that a maximum possible utilization range for the rear-axle steering system results therefrom even at low speeds and high steering angle speeds, in which it is nonetheless always ensured that the rear axle can be reset by the actuator. In some embodiments, the reference utilization is related over all relevant operating points to a constant physical state of the rear-axle steering system, which above all represents a good approximation if the real physical state itself is at least approximately constant, and it therefore at most changes gradually, for example by less than 20%/hour within a journey.

In some embodiments, the determination of the present physical state of the rear-axle steering system is carried out by means of an automatic learning process on the basis of a repeated determination of a respective present operating state of the rear-axle steering system at various operating times. The reliability of the determination of the present physical state of the rear-axle steering system can thus be increased, since any temporarily occurring interference effects or other utilization variations can be damped in this way and thus at least substantially filtered out in terms of or similarly to "noise suppression".

In particular, the learning process can comprise at least one of the following steps:

(i) averaging over the individually detected operating states and/or values for the present utilization at the various operating times; (ii) forming a running maximum value, in which the respective present value for the physical state of the rear-axle steering system is progressively determined as the respective maximum value of at least two values which have occurred up to this point for this physical state or as a function of this maximum value. With the aid of the averaging, the abovementioned "noise suppression" and thus the robustness of the method for determining the present operating state is in turn promoted. The maximum value formation results in learning "upward", i.e., an approximation process starting from a low utilization, in particular an iteration process, to approach a utilization value which characterizes an actual present utilization at least in a very good approximation, wherein the consideration of the so-called "worst case" thus also takes place, in which the highest resistance of the rear wheels against their reset by the actuator into the straight ahead position can still just be ensured.

In some embodiments, the maximum permissible steering angle of the rear-axle steering system for the speed corresponding to a standstill of the vehicle is set to a value greater than zero if the prediction results, on the basis of the determination of the present physical state of the rear-axle steering system, that a reset of the rear axle from a position corresponding to this steering angle not equal to zero into a non-deflected position is also possible at a standstill of the vehicle. For example, the upper limit for the speed/steering angle pair, which is dependent on the physical state of the rear-axle steering system, can be specified so that during a braking maneuver down to a standstill of the vehicle, the maximum steering angle for all speeds passed through in this case corresponds at most to the associated speed-dependent upper limit, wherein this upper limit also remains greater than zero at low speed values down to a standstill. The operating range in which the rear-axle steering system can be used is thus optimized and in particular its use is also enabled in the speed range close to a standstill, for example for maneuvering or parking and pulling out the vehicle.

According to some of these embodiments, the prediction as to whether a reset of the rear axle from the position corresponding to the steering angle not equal to zero into a non-deflected position is also possible at a standstill of the vehicle on the basis of the determination of the present physical state of the rear-axle steering system can take place on the basis of a comparison of the estimated present physical state to a predefined limiting value, which corresponds to the best possible physical state or is below it. It may thus be specified or decided in a simple manner whether the rear-axle steering system operation is to be enabled in the speed range close to a standstill or not.

In some embodiments, the present utilization of the rear-axle steering system is determined on the basis of an actual current consumption or actual power consumption or actual supply voltage in comparison to a maximum possible current consumption or power consumption or supply voltage, in particular per specification. This permits particularly simple and efficient implementations, since the mentioned power consumption values or voltage values can generally be measured or determined easily and at the same time reliably.

In some embodiments, the restriction of the maximum steering angle takes place as a function of the present physical state of the rear-axle steering system only for operating states of the rear-axle steering system from a selected partial range (section) of the operating range, which corresponds to a vehicle speed, steering angle speed, a steering angle, or combination of at least two of these variables, each below a predetermined associated limiting threshold. On the one hand, a complete usability of the rear-axle steering system is ensured outside the partial range, in particular at higher driving speeds and/or lower steering angle speeds, and, on the other hand, it is ensured within the partial range that steering angles do not occur for the rear-axle steering system from which a reset of the rear-axle steering system into the straight ahead position can no longer be ensured in the given operating state.

The limiting threshold for the vehicle speed is selected in some embodiments in particular to be less than or equal to 10 km/h, preferably less than or equal to 6 km/h, particularly preferably less than or equal to 3 km/h. These limiting speeds (which in particular take into consideration the typical maneuvering spectrum when driving, for example, both quasi-stationary maneuvers and also strong braking in the curve) have proven to be particularly suitable with regard to the typical driving speed-dependent curve of the adhesive forces between rear wheels and the underlying surface to define the abovementioned partial range so that the largest possible operating range can be achieved for the rear-axle steering system while simultaneously avoiding the abovementioned reset problems in the event of excessively high adhesive forces.

In some embodiments, the limiting threshold for the vehicle speed is moreover selected variably as a function of the determined present physical state of the rear-axle steering system. While otherwise the limiting threshold would generally be placed sufficiently high in terms of a "worst case" design that the reset problems are also avoided with a just still acceptable present physical state of the rear-axle steering system, instead, in any permissible physical state of the rear-axle steering system, the maximum operating range for use which can be unified therewith can be enabled here. Overall, a greater operating range may thus be used over a large section of the lifetime of the rear-axle steering system than in the case of the mentioned "worst case" design.

In some embodiments, the maximum permissible steering angle of the rear-axle steering system is additionally specified in one of the following ways: (i) as a function of the direction of change of the driving speed of the vehicle, on the sign of the steering angle speed, or whether a distance has already been covered since the last vehicle stop; (ii) as a function of a detected present demand intensity with respect to the steering of the vehicle; (iii) the operating parameter-dependent curve of the maximum permissible steering angle in the operating range corresponds to an iso-force characteristic curve with respect to the occurring steering force on the rear-axle steering system at this steering angle.

According to abovementioned option (i), a first group of cases, in which a positive acceleration exists, during which the absolute value of the vehicle speed increases, as would be the case while pulling out, for example, or in which a distance has not yet been covered since the last stop or a steering angle has not yet been built up and therefore obstacles located between the front wheels and the rear wheels, such as a curbstone edge, are still to be expected, can be differentiated from other cases. In particular, such other cases can belong to a second group of cases, in which the vehicle speed decreases or a distance has already been covered or a steering angle has already built up, so that it is to be presumed that the front wheels have already passed the underlying surface region to be traveled next by the rear wheels, so that no obstacles are to be expected there. A curve of the maximum permissible steering angle subject to hysteresis may therefore overall be achieved as a function of the driving speed, which can be used to further optimize the available operating range of the rear-axle steering system, in particular to maximize it.

According to abovementioned option (ii), a further optimization of the operating range can take place in that in the individual case, depending on demand, the usable operating range can be expanded into an operating parameter range actually lying beyond its defined limits. This can take place in particular if a detected present demand intensity is above a limiting value defined for this purpose. The demand intensity can be detected in particular as a torsion torque on a steering device, typically the steering wheel, of the vehicle, wherein the detection can take place continuously or in discrete steps. Another option for detecting the demand intensity can be that obstacles are detected which would be driven around more easily using the rear-axle steering system than without using it or would be driven around at all only upon its use. The detection of obstacles can take place here in particular on the basis of corresponding high-resolution map data or by means of intrinsic sensors of the vehicle, for example by means of a parking aid sensor (park distance control, PDC), or a camera system. Special areas, such as parking lots, which can regularly place particularly high demands on the steering capability of the vehicle, are also recognizable by means of such map data or sensor systems and can be assessed, when they are recognized, as an increased demand intensity. Moreover, a demand intensity can be detected as a function of whether a recorder function of a driver assistance system is used. In the case of such functions, it is often significant that obstacles are driven around precisely as during the preceding recording, where possibly the driving speed could be greater than during the reverse playback (vehicle control on the basis of the recording, but in reverse chronological sequence, for example, pulling out controlled via recording after preceding parking procedure, which was recorded).

According to abovementioned option (iii), the limits of the presently usable operating range can be selected by means of the iso-force characteristic curve so that the force corresponding to this characteristic curve, for all operating points within the operating range enclosed by the limiting line, is less than or equal to the maximum force which the actuator can apply to reset the rear-axle steering system into the straight ahead position. A high reliability with respect to a secure ability to reset the rear-axle steering system can thus be achieved in a simple manner.

In some embodiments, the method furthermore comprises at least one of the following measures: (i) limiting the steering angle to the maximum permissible steering angle during the activation of the rear-axle steering system is only applied if the steering angle exceeds a defined minimum deflection; (ii) the maximum steering angle speed applied by the actuator for the rear-axle steering system is specified as a function of the present driving speed of the vehicle.

The use of a minimum deflection limit according to measure (i) permits the restriction of the steering angle only to be carried out as much as is necessary in order to achieve the reset of the rear-axle steering system at least to this minimum deflection, which in particular can be specified so that it is not normally visually perceived at all by a vehicle-external observer or is only visually perceived with low probability (for example, <25%, preferably <10%). This also enables an enlargement and thus optimization of the usable operating range of the rear-axle steering system, since the often particularly high forces for the complete reset on the rear-axle steering system exactly to straight ahead driving (steering angle 0°) can be avoided.

A second aspect of the invention relates to a device for controlling a rear-axle steering system of a vehicle having a steerable rear axle, wherein the device is configured to execute the method according to the first aspect of the invention. The device can be designed in particular as a computer-supported or processor-supported control unit.

A third aspect of the invention relates to a computer program, having instructions which, upon their execution on a device according to the second aspect of the invention, cause it to carry out the method according to the first aspect of the invention.

The computer program can be stored in particular on a nonvolatile data carrier. This is preferably a data carrier in the form of an optical data carrier or another nonvolatile memory, such as a flash memory module. This can be advantageous if the computer program as such is to be handled independently of a processor platform, on which the one or the multiple programs are to be executed. In another implementation, the computer program can be provided as a file on a data processing unit, in particular on a server, and can be downloadable via a data connection, for example the Internet or a dedicated data connection, such as a proprietary or local network. Moreover, the computer program can have a plurality of interacting individual program modules.

The device according to the second aspect of the invention can accordingly have a program memory in which the computer program is stored. Alternatively, the device can also be configured to access an externally available computer program, for example, on one or more servers or other data processing units, via a data communication connection, in particular to exchange data with this program, which are used during the running of the method or computer program or represent outputs of the computer program.

A fourth aspect of the invention relates to a vehicle having a steerable rear axle, wherein the vehicle has a device according to the second aspect of the invention for the control of its rear axle. Ideally, the vehicle also has a steerable front axle, so that the rear axle then generally does not function as the main steering system, but only as an auxiliary steering system.

The features and advantages explained with reference to the first aspect of the invention also apply accordingly to the further aspects of the invention.

Further advantages, features, and possible applications of the present invention result from the following detailed description in conjunction with the figures.

BRIEF DESCRIPTION OF THE DRAWINGS

In the figures, the same reference signs are used throughout for the same elements or elements corresponding to one another of the invention.

DETAILED DESCRIPTION OF THE DRAWINGS

Figure 1:
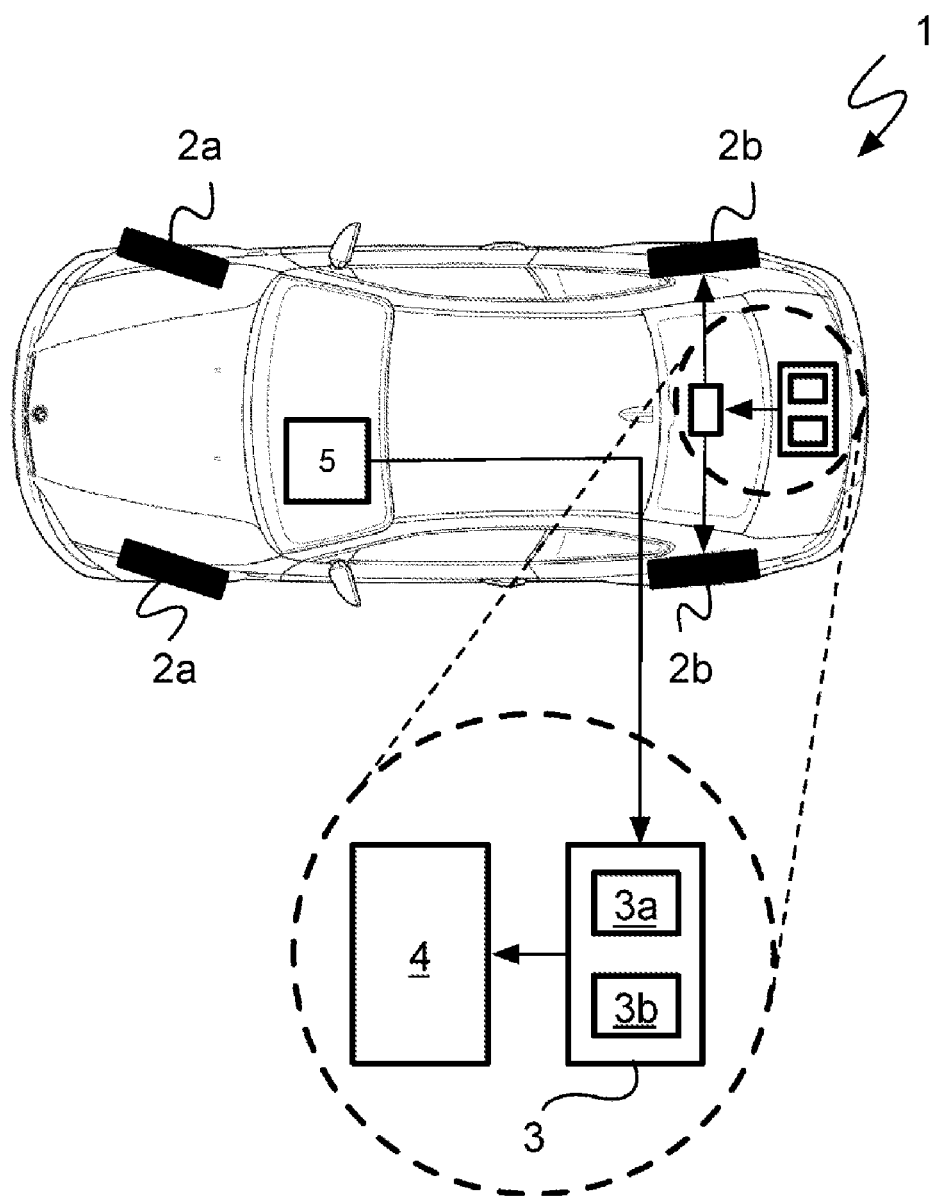
FIG. 1 schematically shows an exemplary vehicle having a rear-axle steering system including an embodiment of the device according to the invention for controlling the rear-axle steering system.

An exemplary vehicle 1 is shown in FIG. 1, which has two steerable front wheels 2a and two rear wheels 2b, also steerable by means of a rear-axle steering system. The rear-axle steering system in particular has a control device 3, which in turn has a processor platform 3a and a memory 3b, which is used in particular as a program and data memory. A computer program is stored in the memory 3b which, upon its execution on the processor platform 3a, causes it to carry out the method according to the invention, in particular as described hereinafter with reference to the embodiment shown by way of example in FIG. 2. In the scope of the method, the control device 3 receives measurement data from a sensor device 5 of the vehicle 1, which can itself have one or more sensors. The measurement data relate to the items of information required in the scope of the method on the present vehicle status and especially also the rear-axle steering system status, such as in particular the absolute value of the vehicle (longitudinal) speed Vx and its direction of change Rx, steering angle L, steering angle speed VL, demand intensity (steering wheel torsion torque) B, and the actual current consumption $I_{act}$ of the actuator 4, the latter in any case if this information is not provided by the actuator 4 itself.

Figure 2:
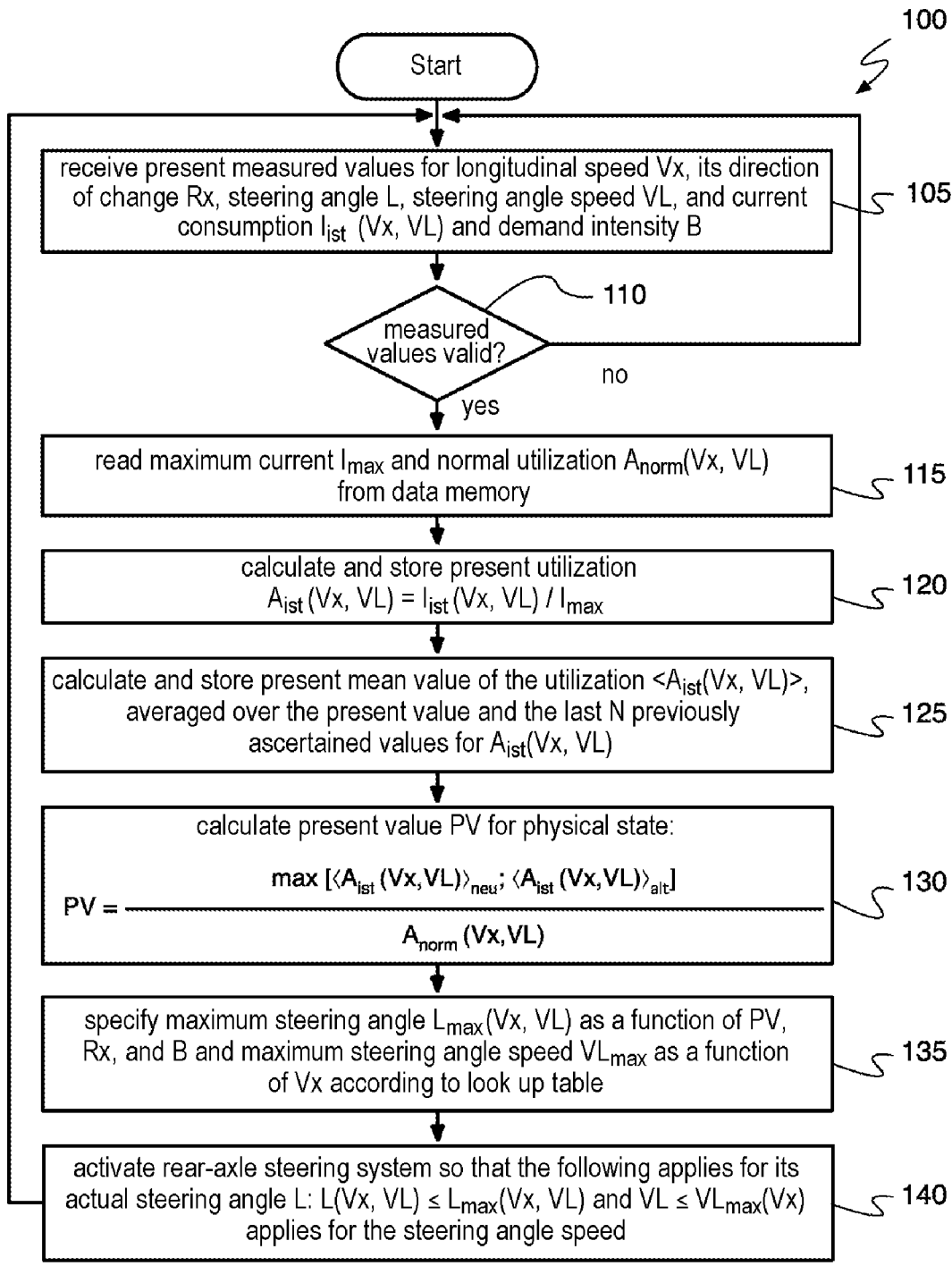
FIG. 2 is a flow chart to illustrate an exemplary embodiment of the method according to the invention.

The method 100 shown in FIG. 2 for controlling a rear-axle steering system of a vehicle, for example the vehicle 1 from FIG. 1, can be executed in particular by a control device for a rear-axle steering system, for example by the control device 3 from FIG. 1. Therefore, reference is made for the purposes of better illustration of the method 100 to the vehicle 1 from FIG. 1, without this being interpreted as a restriction, however.

In the scope of the method, the device 3 receives the above-described measurement data acquired by the sensor device 5 of the vehicle 1 for the variables Vx, Rx, L, VL, $I_{act}$, and B. In a further step 110 it is checked whether these measured values are each in an assigned validity range. If this is the case (110—yes), the method is continued with the next step 115. Otherwise (110—no), the method jumps back to the starting point and is then run through again. In this way, it is possible to prevent obviously incorrect measured values from being used in the scope of the further method for determining the maximum steering angle for the rear-axle steering system.

In step 115, values stored in the memory 3b are read therefrom for the specified maximum current consumption $I_{max}$ of the actuator 4 and the reference utilization $A_{norm}$ (Vx, VL), wherein the reference utilization is defined as a function of the longitudinal speed Vx and the steering angle speed VL and can be represented in the memory 3b, for example, by means of a corresponding value table stored therein.

Now, initially in a step 120 according to the following equation (1), a present utilization $A_{act}$(Vx, VL) of the actuator 4 at the present longitudinal speed Vx and the present steering angle speed VL is determined as the ratio of the associated present actual current consumption $I_{act}$ (Vx, VL) to the maximum power consumption $I_{max}$ and stored in the memory 3b:

$$A_{act}(Vx,VL)=I_{act}(Vx,V0)/I_{max} \qquad (1)$$

The value for the maximum current consumption $I_{max}$ can in particular also be specified as a function or in dependence on a voltage value of the associated supply voltage. The time curve of the variable $A_{act}$ (Vx, VL) can in practice be subject to significant variations over time. These can result in particular if the vehicle 1 carries out one or more cornering actions on various underlying surfaces using the rear-axle steering system in the course of a journey, so that different coefficients of friction of the various underlying surfaces or mechanical oscillations result in varying forces on the rear wheels 2b and thus also on actuator 4. To smooth such variations with regard to the smoothest possible operation of the rear-axle steering system, in a further step 125 averaging is carried out over the present value and the respective last N previously ascertained values for the variable $A_{act}$ (Vx, VL) to obtain a corresponding mean value $\langle A_{act}$ (Vx, VL)$\rangle$.

On the basis of this present mean value $\langle A_{act}$(Vx, VL)$\rangle_{neu}$ and the previous mean value $\langle A_{act}$(Vx, VL)$\rangle_{alt}$ determined in the same way in the preceding method path, in a step 130, a value PV for characterizing the present physical state of the rear-axle steering system can now be calculated according to following equation (2). For this purpose, the greater of the two mentioned mean values for the present actual utilization $A_{act}$ is set in relation to the reference utilization for the same values of the variables Vx and VL:

$$PV = \frac{\max[\langle A_{ist}(Vx, VL)\rangle_{neu}; \langle A_{ist}(Vx, VL)\rangle_{alt}]}{A_{norm}(Vx, VL)} \qquad (2)$$

In a step 135, a presently valid maximum steering angle $L_{max}$(Vx, VL) can now be specified for the rear-axle steering system as a function of the determined value for PV and the previously received values for the direction of change Rx and the demand intensity B. In addition, a maximum steering angle speed $VL_{max}$(Vx) can also be specified as a function of the longitudinal speed Vx. For both mentioned specifications, in particular a lookup table stored in the memory 3b can be used, which relates the respective input variables to the desired output variables. If the actual steering angle L is above the corresponding maximum steering angle $L_{max}$ at a given operating point of the operating parameter range, this can thus be assessed as the specification in such a way that in this operating point a reset of the rear wheels 2b from this steering angle cannot be ensured. This question is relevant in particular for operating points corresponding to a vehicle standstill, since it can thus be checked whether a reset into the straight ahead position is still reliably possible at all at a standstill.

Finally, in a step 140, the control device 3 can activate the actuator 4 on the basis of the abovementioned specifications so that it restricts the actual steering angle of the rear-axle steering system so that it is less than or equal to the specified maximum steering angle $L_{max}$(Vx, VL) and at the same time also the actual steering angle speed VL is limited by the maximum steering angle speed $VL_{max}$(Vx). In the scope of a loop, the method then jumps back to the starting point and is run through again.

Figure 3:
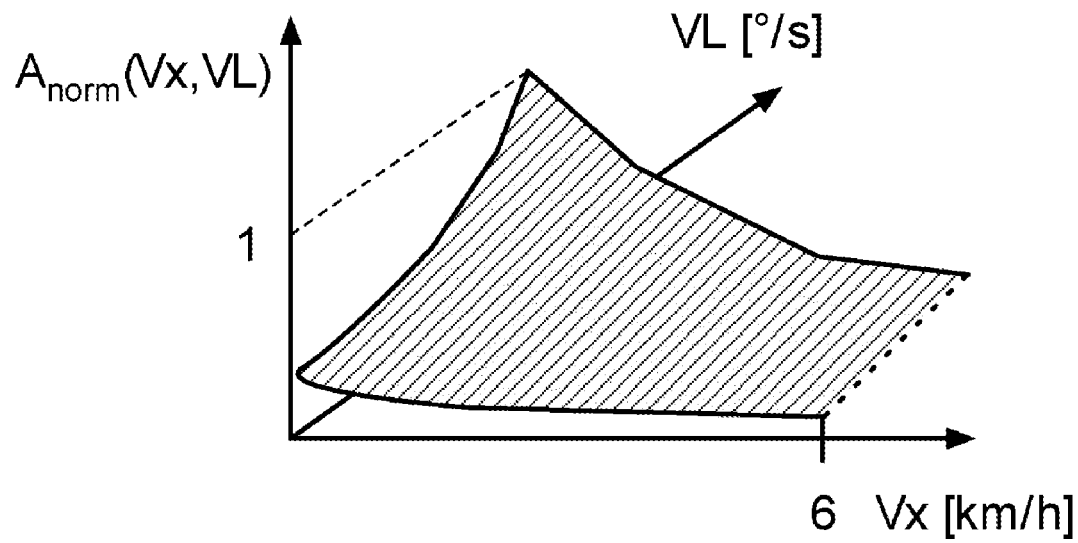
FIG. 3 is a schematic illustration of a parameterization of the operating range of a rear-axle steering system by means of a corresponding coordinate system including a reference characteristic curve surface drawn therein.

FIG. 3 shows a characteristic curve surface for the reference utilization via $A_{norm}$(Vx, VL) as a function of the longitudinal speed Vx and the steering angle speed VL. The reference utilization $A_{norm}$ is defined on a finite partial range (or section) of the operating parameter range spanned by Vx and VL, specifically so that $A_{norm}$ always has values less than or equal to "1" (=100%) and here in particular only reaches the value "1" at a single operating point within the mentioned partial range of the operating parameter range. This point is that operating point in the mentioned partial range having minimal longitudinal speed Vx and maximum steering angle speed VL, which typically corresponds to the greatest possible adhesive force of the wheels on the underlying surface for all operating points within the partial range.

The partial range is delimited here, for example, along the Vx axis by the value 6 km/h, wherein other values can also be used, of course. However, it has been shown that values from the range of 3 km/h to 6 km/h each represent a particularly reasonable limit, since the above-described reset problems in practice can typically be displayed above all in a speed range below these values and since speed values above these limiting values can be strongly influenced by possible lateral accelerations of the vehicle 1. Similarly, the partial range along the steering angle speed dimension can in particular be limited to a value of approximately 3°/s for the same reasons.

The characteristic curve surface for the reference utilization $A_{norm}(Vx, VL)$ therefore specifies, in a given physical state, a limiting surface within the operating parameter space, in which a reset of the rear-axle steering system into the straight ahead position is still just ensured for all operating points. For higher degrees of utilization with respect to the respective operating point, in contrast, this can no longer be guaranteed for each operating point, in particular not for low longitudinal speeds Vx and/or high steering angle speeds VL within the mentioned partial range of the operating parameter range.

Figure 4:
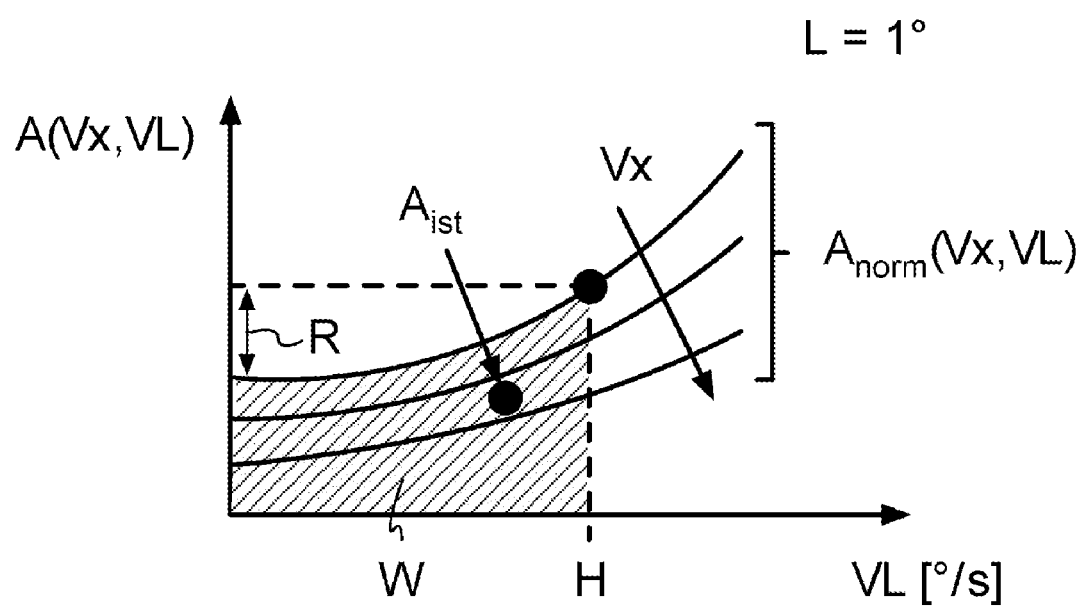
FIG. 4 is a two-dimensional illustration of the characteristic curve surface according to FIG. 3 to illustrate a learning range for the determination of a present utilization, here based on the example of a reference steering angle of 1°.

FIG. 4 shows a characteristic curve surface in the form of multiple two-dimensional sections through the characteristic curve surface from FIG. 3. In this case, the dependence of the utilization along the dimension of the steering angle speed VL is observed, while the corresponding characteristic curves of $A_{norm}(Vx, VL)$ are shown for various longitudinal speeds Vx as corresponding individual characteristic curves. It may be seen particularly well in the illustration that the resulting utilization is lower the higher the longitudinal speed Vx is, since higher longitudinal speeds Vx generally result in less adhesion or spinning friction between rear wheel 2b and underlying surface and accordingly the actuator 4 has to apply less energy for the steering process.

In addition, the adhesion limit H is shown in relation to the steering angle speed VL in FIG. 4, above which the adhesive or friction forces become so great that the actuator 4 can no longer ensure that the rear wheels 2B can be deflected and reset according to the activation, in particular can be reset into the straight ahead position. At a lower degree of utilization, in contrast, at low steering angle speeds VL, a certain utilization reserve R results (illustrated here on the example of the characteristic curve for the smallest value of Vx). Accordingly, the section of the operating parameter range shown shaded and located below the respective characteristic curve and below the adhesive limit is provided as a learning range W for the determination of a present utilization $A_{act}$ in the scope of the iterative method 100 described with reference to FIG. 2 (the entire shaded range corresponds here to the uppermost of the characteristic curves shown, i.e., that for the least value of Vx).

Figure 5:
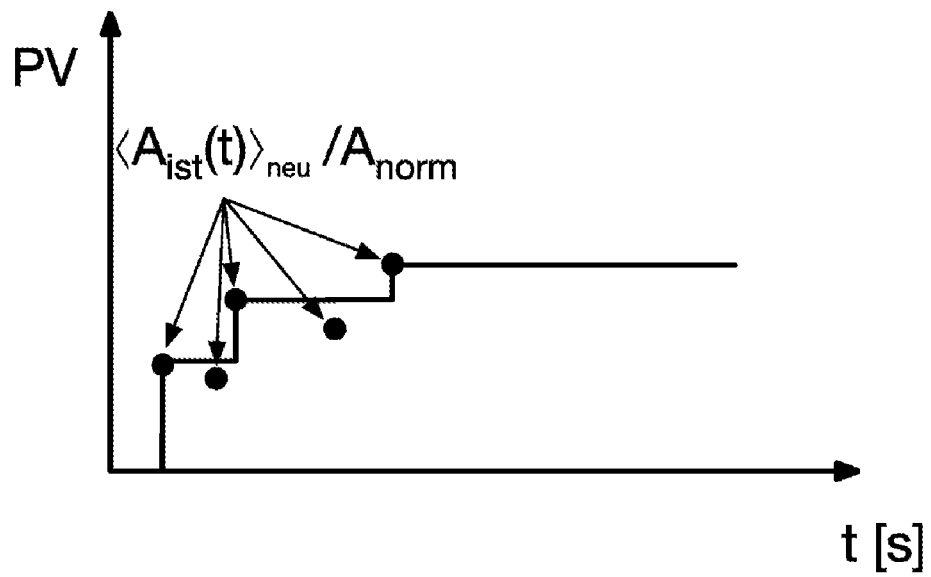
FIG. 5 shows a chronological development of the utilization to illustrate a learning process usable in conjunction with the invention for the determination of a present degree of utilization A, in particular with regard to a determination based thereon of a present physical state of the rear-axle steering system.

FIG. 5 shows for this purpose the time curve of a corresponding learning process, wherein successive learning events for the quotient value $<A_{act}(t)>/A_{norm}$ are shown as black dots. The learning based on successive measurements and determinations of $<A_{act}(t)>$ takes place here on the basis of the maximum value formation in step 130 of the method 100 "from below". This means that in any case in the scope of the respective last two measurements, only those learning events are taken into consideration for the determination of the physical state PV of the rear-axle steering system which are associated with a maximum value of $<A_{act}(t)>$. However, it is also possible to use a greater number of preceding values for $<A_{act}(t)>$ than only two for the maximum value formation. Moreover, it can be specified that PV in principle has to be a monotonously growing variable, i.e., each new value for PV has to be greater than or equal to the preceding value of PV.

Figure 6:
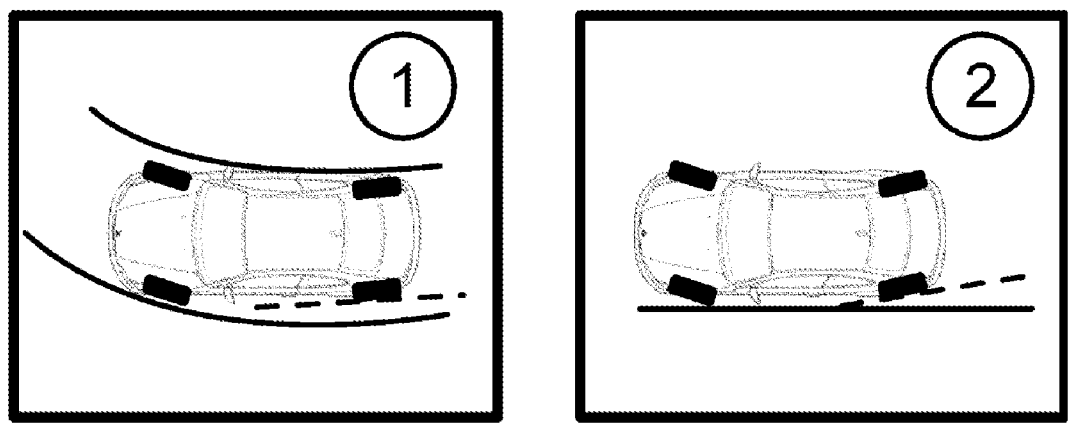
FIG. 6 is a graphic illustration of two different applications (use cases) for the operation of a rear-axle steering system.

FIG. 6 shows a graphic illustration of two different applications (use cases) for the operation of the rear-axle steering system, which are explained in detail hereinafter with reference to FIGS. 7A or 7b. The first application "1" relates to a typical cornering action of the vehicle 1, wherein the rear wheels 2b essentially, i.e., in the scope of the deviations typical in a rear-axle steering system, follow the track of the front wheels 2b. Accordingly, in this case the front wheels 2a have already covered a distance since the last time they started driving from a standstill in the forward direction.

In contrast, the second application "2" relates to a pulling out situation, in which the vehicle 1 parked against a curbstone is to emerge from the standstill with at least partially deflected rear-axle steering system into a forward travel. Therefore, a distance has not yet been covered since the last standstill, so that there is the risk that the rear wheels 2b could drive onto an obstacle over which the front wheels 2b have not yet driven, specifically the curbstone edge here.

Figure 7A:
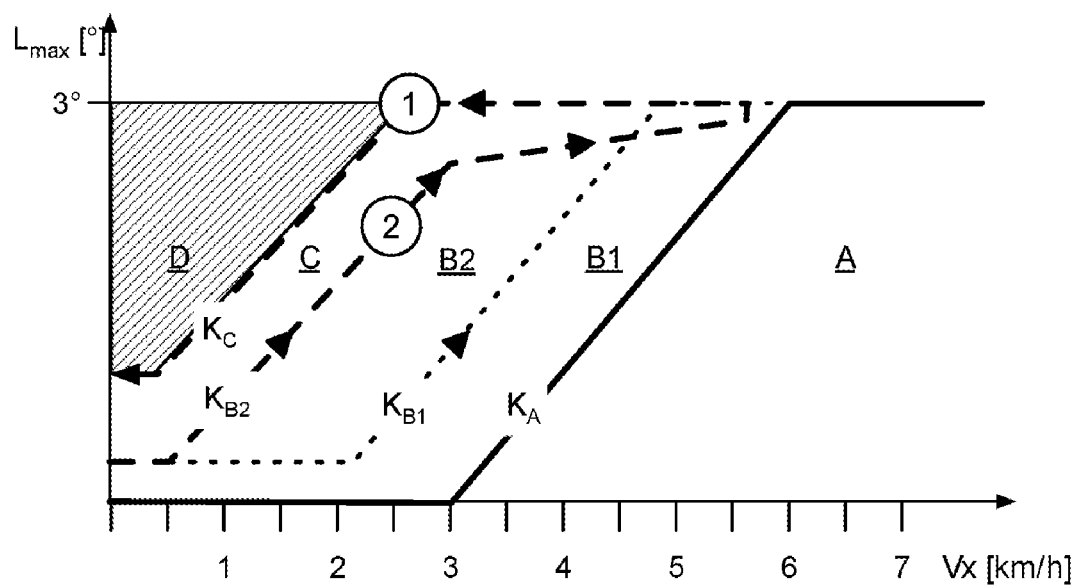
FIG. 7 is an illustration of the curve of a characteristic curve specifying the usable operating range of the rear-axle steering system for the maximum steering angle as a function of the longitudinal speed of the vehicle, in particular as a function of the two applications from FIG. 6.
Figure 7B:
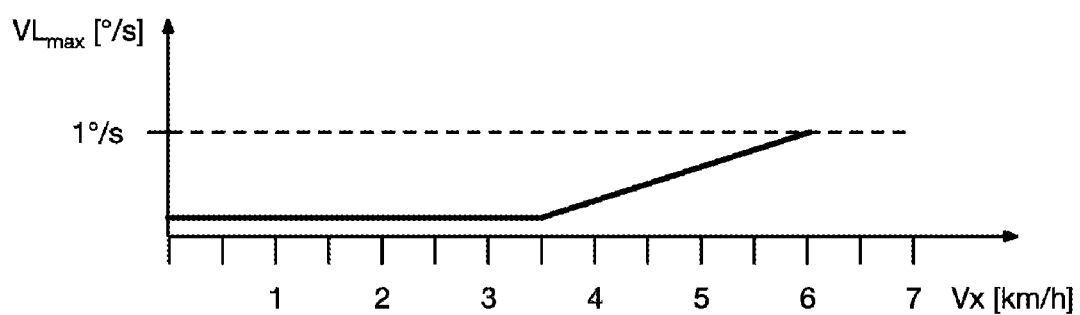

The diagram in FIG. 7A illustrates by way of example various zones A, B1, B2, C, and D of the operating parameter range of a rear-axle steering system with regard to the longitudinal speed Vx and the maximum steering angle $L_{max}$ at a given maximum steering angle speed VL. The mentioned zones are separated from one another here by the various identified characteristic curves $K_A$, $K_{B1}$, $K_{B2}$, and $K_C$, respectively.

The first characteristic curve $K_A$ (solid) delimits the zone A in relation to lower longitudinal speeds Vx and in relation to a system-related maximum possible steering angle, which is to be 3° here by way of example. Within this zone A, the longitudinal speed Vx is always sufficiently high that a reset of the rear-axle steering system into the straight ahead position is possible for every operating point in consideration of all typical driving maneuvers, in particular including braking in the curve. At lower longitudinal speeds beyond the characteristic curve $K_A$, however, this can no longer be ensured, so that from a limiting speed, which is 3 km/h here, for example, the rear-axle steering system is automatically brought into the straight ahead position to avoid a following situation beyond the zone A, in which the reset of the rear wheels 2b into the straight ahead position is no longer possible, in particular no longer possible from a standstill. In known solutions, such a characteristic curve $K_A$ is permanently specified, but without previously determining the physical state of the rear-axle steering system and specifying the characteristic curve $K_A$ as a function thereof.

According to the invention, but in particular also in the scope of the method 100 from FIG. 2, however, the physical state of the rear-axle steering system is determined and a maximum steering angle $L_{max}(PV)$ is determined in dependence thereon, which can be represented by a corresponding characteristic curve in the diagram from FIG. 7A. One example of this is the characteristic curve $K_{B1}$ shown by dotted lines, which defines a zone B1 to the right of it (including the zone A). Within this zone B1, the statements already made above on zone A apply, i.e., for all operating points within the zone B1, a reset of the rear wheels 2B into the straight ahead position is always possible in this case independently of direction. The precise location of the characteristic curve $K_{B1}$ is dependent on the present value for the physical state PV.

A further example of a solution according to the invention is illustrated in FIG. 7A on the basis of a third characteristic curve $K_{B2}$ (dashed), which defines a zone B2 to the right of it (including the zones B1 and A). As in the case of the characteristic curve $K_{B1}$, the location of the characteristic curve $K_{B2}$ is also dependent on the present value for the physical state PV, which differs in the example shown from that for the characteristic curve $K_{B1}$. The characteristic curve $K_{B2}$ rises to the greatest steering angle possible overall, wherein, however, the slope of the characteristic curve does not extend consistently. In particular—as shown—it can extend flatter at somewhat higher longitudinal speeds Vx (in the example from approximately 2.8 km/h) than at longitudinal speeds Vx lying below this.

However, the characteristic curve $K_{B2}$ corresponding to rising longitudinal speeds Vx only represents a first branch of an overall characteristic curve, which displays a hysteresis, i.e., a curve dependent on the respective preceding state. This is because the overall characteristic curve also has a second branch $K_C$, which corresponds to decreasing longitudinal speeds Vx and is not congruent with the first branch. A further zone C is spanned between these two branches, which, in contrast to the zones A, B1, and B2, only represents a permitted range for the steering angle L at decreasing longitudinal speeds Vx. This means that greater steering angles L are permitted in the case of decreasing longitudinal speed than in the case of increasing speed. In particular, this difference can be applied in conjunction with the two applications from FIG. 6. Since in the application "1" corresponding to the characteristic curve $K_C$, in contrast to the application "2" corresponding to the characteristic curve $K_{B2}$, an obstacle acting on the rear wheels 2B is not to be expected, the maximum steering angle $L_{max}$ can be selected higher here than in the application "2".

The second branch $K_C$ of the characteristic curve at the same time defines a forbidden zone D located to the left thereof, which covers a steering angle range which is not permitted. This means that the control device ensures by means of a corresponding activation of the actuator 4 that the actual steering angle L does not enter the range of the zones D. In exceptional cases, this can nonetheless be permitted case by case, in particular if on the basis of a comparison of the detected demand intensity B, in particular a high steering wheel torsion torque lying above a defined associated threshold, an explicit driver intention is recognized to move the steering angle nonetheless into this zone D. As already described above, other options are also possible for specifying a correspondingly high demand intensity B, for example an automatic obstacle recognition. The overall characteristic curve or one or more sections thereof can be defined in particular in the form of an iso-force characteristic curve, so that along the characteristic curve or the respective section or sections, the counterforce originating from the adhesion of the rear wheels on the underlying surface and acting on the rear-axle steering system upon its actuation at a given steering angle speed VL extends consistently.

In addition to limiting the steering angle L to a maximum value $L_{max}(Vx, VL)$, limiting the steering angle speed VL itself is also possible. This is illustrated in FIG. 7B, where the maximum permitted steering angle speed $VL_{max}$ is specified as a characteristic curve as a function of the longitudinal speed Vx. In this example, the design-related maximum permitted value for the steering angle speed is specified at 1°/s as an example.

In all abovementioned cases, it can moreover be specified that the automatic characteristic curve-related reset of the rear wheels 2b only takes place up to a specified minimum angle not equal to zero, i.e., different from the straight ahead position, which is selected so that it typically is not recognized or is only rarely recognized as deviating from the straight ahead position upon visual observation. In this way, it is possible to shift the characteristic curves toward higher permitted maximum steering angles and to avoid the associated energy demand and wear for reaching a straight ahead position.

While at least one exemplary embodiment was described above, it is to be noted that a large number of variations thereto exist. It is also to be noted that the described exemplary embodiments only represent nonlimiting examples, and it is not intended that the scope, the applicability, or the configuration of the devices and methods described here be restricted thereby. Rather, the preceding description will supply a person skilled in the art with an introduction for implementing at least one exemplary embodiment, wherein it is obvious that various changes can be performed in the functionality and the arrangement of the elements described in one exemplary embodiment, without deviating from the subject matter specified in the respective attached claims and its legal equivalents.

LIST OF REFERENCE SIGNS 1 vehicle
2a front wheels
2b rear wheels
3 control device of the rear-axle steering system
3a processor platform
3b memory, in particular data and program memory
4 actuator of the rear-axle steering system
5 vehicle sensor system
100-140 method steps
$A_{act}$ actual utilization
$A_{norm}$ reference utilization
A conventional zone of direction-independent availability
B1, B2 variably definable zone of direction-independent availability
B demand intensity, for example steering wheel torsion torque
C zone of direction-dependent availability
D forbidden zone
H adhesion limit
$I_{act}$ actual current consumption
$I_{max}$ maximum current consumption
$K_A$ characteristic curve for zone A
$K_{B1}$ characteristic curve for zone B1
$K_{B2}$ characteristic curve for zone B2
$K_C$ characteristic curve for zone C, delimits zone D at the same time
L steering angle
$L_{max}$ maximum steering angle
N number of preceding values for $A_{act}$ to be taken into consideration in the averaging
PV physical state (health) of the rear-axle steering system
R utilization reserve
Rx direction of change of the longitudinal speed, i.e., speed increase or decrease
t time
VL steering angle speed
$VL_{max}$ maximum steering angle speed
Vx longitudinal speed
W learning range

The invention claimed is:

1. A method for controlling a rear-axle steering system of a vehicle having a steerable rear axle, comprising:
 determining a present physical state of the rear-axle steering system based on a detected present operating state ($A_{act}$) and a predetermined reference operating state ($A_{norm}$) of the rear-axle steering system;
 specifying a maximum permissible value of a steering angle ($L_{max}$) of the rear-axle steering system as a function of an estimated physical state of the rear-axle steering system and as a function of at least one of operating parameters driving speed (Vx), the steering angle (L) of the rear-axle steering system, and steering angle speed (VL) of the vehicle; and activating the rear-axle steering system so that the steering angle (L) of the rear-axle steering system does not exceed an assigned specified maximum permissible value of the steering angle ($L_{max}$) with the operating parameter(s) (Vx,VL) of the vehicle.

2. The method according to claim 1, wherein
the determination of the present physical state of the rear-axle steering system is carried out based on the present utilization ($A_{act}$) of a specified operating range of an actuator of the rear-axle steering system provided for its actuation.

3. The method according to claim 2, wherein:
the reference operating state defines a reference utilization ($A_{norm}$) of the operating range and the determination of the present physical state of the rear-axle steering system is carried out based on a comparison ($A_{act}$) of the detected present utilization of the operating range of the actuator to the reference utilization ($A_{norm}$); and
the present utilization and the reference utilization ($A_{norm}$) are each related to same operating parameter(s) (Vx, VL, L) of the rear-axle steering system and same values thereof.

4. The method according to claim 3, wherein:
the reference utilization ($A_{norm}$) represents an operating point on a characteristic curve or a multidimensional characteristic curve surface for the utilization of the actuator, which is related to the operating range; and
for each operating point (Vx, VL, L) on this characteristic curve or characteristic curve surface, the actuator ensures a reset of the rear axle from a position corresponding to a steering angle (L) not equal to zero into a non-deflected position, while the actuator no longer ensures this for every utilization above this characteristic curve or this characteristic curve surface.

5. The method according to claim 1, wherein
the determination of the present physical state of the rear-axle steering system is carried out via an automatic learning process based on a repeated determination of a respective present operating state of the rear-axle steering system at various operating times (t).

6. The method according to claim 5, wherein the automatic learning process comprises at least one of the following steps:
(i) averaging over detected operating states at various operating times; or
(ii) a running maximum value formation, in which a present value of a physical state of the rear-axle steering system is set as a respective maximum value of at least two values.

7. The method according to claim 1, wherein the maximum permissible value of the steering angle ($L_{max}$) of the rear-axle steering system for a speed corresponding to a standstill of the vehicle is set to a value greater than zero if, based on the determination of the present physical state of the rear-axle steering system, a result of the determination is that a return of the rear axle from a position corresponding to the steering angle, different from zero, to a non-deflected position is possible even when the vehicle is at the standstill.

8. The method according to claim 7, wherein
the prediction based on the determination of the present physical state of the rear-axle steering system as to whether a reset of the rear axle from the position corresponding to the steering angle not equal to zero into a non-deflected position is also possible at a standstill of the vehicle is carried out based on a comparison of the estimated present physical state to a predefined limiting value, which corresponds to a best possible physical state or is below the best possible physical state.

9. The method according to claim 2, wherein
the present utilization ($A_{act}$) of the rear-axle steering system is determined based on one of an actual current consumption ($I_{act}$), actual power consumption, actual supply voltage in comparison to a maximum possible current consumption, power consumption, or supply voltage.

10. The method according to claim 1, wherein
restriction of the maximum permissible value of the steering angle ($L_{max}$) as a function of the present physical state of the rear-axle steering system only takes place for operating states of the rear-axle steering system from a selected partial range of an operating range, which corresponds to one or more of a vehicle speed (Vx), a steering angle speed (VL), the steering angle (L) of the rear-axle steering system, each below a predetermined associated limiting threshold.

11. The method according to claim 1, wherein the maximum permissible steering angle of the rear-axle steering system is additionally specified in one of the following ways:
(i) as a function of a direction of change of the driving speed (Vx) of the vehicle, of a sign of the steering angle speed (VL), or as to whether a distance has already been covered since a last vehicle stop;
(ii) as a function of a detected present demand intensity (B) with respect to the steering of the vehicle; or
(iii) an operating parameter-dependent curve of the maximum permissible value of the steering angle ($L_{max}$) in the operating range corresponds to an iso-force characteristic curve with respect to an occurring steering force on the rear-axle steering system at the maximum permissible steering angle (L).

12. The method according to claim 1, further comprising at least one of the following measures:
limiting of the steering angle (L) of the rear-axle steering system to the maximum permissible value of the steering angle ($L_{max}$) during the activation of the rear-axle steering system is only applied if the steering angle (L) of the rear-axle steering system exceeds a defined minimum deflection; or
specifying a maximum steering angle speed (VL) applied by the actuator for the rear-axle steering system as a function of the present driving speed (Vx) of the vehicle.

13. A device for controlling a rear-axle steering system of a vehicle having a steerable rear axle, comprising:
a processor-based control unit operatively configured to:
determine a present physical state of the rear-axle steering system based on a detected present operating state ($A_{act}$) and a predetermined reference operating state ($A_{norm}$) of the rear-axle steering system;
specify a maximum permissible value of the steering angle ($L_{max}$) of the rear-axle steering system as a function of an estimated physical state of the rear-axle steering system and as a function of at least one of operating parameters driving speed (Vx), steering angle (L), and steering angle speed (VL) of the vehicle; and
activate the rear-axle steering system so that the steering angle (L) of the rear-axle steering system does not exceed an assigned specified maximum permissible value of the steering angle ($L_{max}$) with the present operating parameter(s) (Vx, VL) of the vehicle.

14. A vehicle comprising:
a steerable rear axle; and
a device according to claim 13 for controlling the steerable rear axle.

15. A computer product comprising a non-transitory computer readable medium having stored thereon program code which, upon execution by a processor, carries out the acts of:
determining a present physical state of the rear-axle steering system based on a detected present operating state ($A_{act}$) and a predetermined reference operating state ($A_{norm}$) of the rear-axle steering system;
specifying a maximum permissible value of a steering angle ($L_{max}$) of the rear-axle steering system as a function of the estimated physical state of the rear-axle steering system and as a function of at least one of operating parameters driving speed (Vx), steering angle (L), and steering angle speed (VL) of the vehicle; and
activating the rear-axle steering system so that the steering angle (L) of the rear-axle steering system does not exceed an assigned specified maximum permissible value of the steering angle ($L_{max}$) with the present operating parameter(s) (Vx, VL) of the vehicle.

\* \* \* \* \*